US011248668B2

(12) United States Patent
Azuma et al.

(10) Patent No.: US 11,248,668 B2
(45) Date of Patent: Feb. 15, 2022

(54) WORKING VEHICLE

(71) Applicant: KUBOTA CORPORATION, Osaka (JP)

(72) Inventors: Hitoshi Azuma, Osaka (JP); Tetsuo Yamaguchi, Osaka (JP); Shinji Ohara, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/950,328

(22) Filed: Nov. 17, 2020

(65) Prior Publication Data

US 2021/0164561 A1 Jun. 3, 2021

(30) Foreign Application Priority Data

Dec. 2, 2019 (JP) .............................. JP2019-218408
Jun. 26, 2020 (JP) .............................. JP2020-110793

(51) Int. Cl.
*F16D 48/06* (2006.01)
*F16H 61/06* (2006.01)
*B60K 23/08* (2006.01)

(52) U.S. Cl.
CPC ............ *F16D 48/062* (2013.01); *F16H 61/06* (2013.01); *B60K 2023/0825* (2013.01);
(Continued)

(58) Field of Classification Search
CPC .... B60K 23/08–2023/0891; B60K 2023/0825; B60K 2023/0883; F16D 48/062; F16D 2500/10431; F16D 2500/1112; F16D 2500/30803; F16D 2500/31493; F16D 2500/3166; F16H 59/56; F16H 61/06; F16H 61/0437; F16H 2061/0255; F16H 2061/026; F16H 2037/0886
See application file for complete search history.

(56) References Cited

U.S. PATENT DOCUMENTS 4,893,527 A   1/1990 Furusawa et al.
4,947,734 A   8/1990 Fujita et al.
(Continued)

FOREIGN PATENT DOCUMENTS

JP   2000-198362 A   7/2000
JP   2005-263170 A   9/2005

OTHER PUBLICATIONS

Extended European Search Report issued in corresponding European Patent Application No. 20209666.5 dated Apr. 30, 2021.

*Primary Examiner* — Timothy Hannon
(74) *Attorney, Agent, or Firm* — Greenblum & Bernstein, P.L.C.

(57) ABSTRACT

A working vehicle includes a first hydraulic clutch connected to the first traveling shaft, a second hydraulic clutch connected to the first traveling shaft separately from the first hydraulic clutch, a first gear mechanism to transmit, to a second traveling shaft, power from the first hydraulic clutch when the first hydraulic clutch is engaged and not to transmit, to the second traveling shaft, power from the first hydraulic clutch when the first hydraulic clutch is disengaged, and a second gear mechanism to transmit, to the second traveling shaft, power from the second hydraulic clutch when the second hydraulic clutch is engaged and not to transmit, to the second traveling shaft, power from the second hydraulic clutch when the second hydraulic clutch is disengaged.

20 Claims, 9 Drawing Sheets

(52) U.S. Cl.
CPC ............... *B60K 2023/0883* (2013.01); *F16D 2500/10431* (2013.01); *F16D 2500/1112* (2013.01); *F16D 2500/30803* (2013.01); *F16D 2500/3166* (2013.01); *F16D 2500/31493* (2013.01)

(56) References Cited

U.S. PATENT DOCUMENTS

| | | |
|---|---|---|
| 5,406,483 A | 4/1995 | Kallis et al. |
| 2003/0104893 A1 | 6/2003 | Horiguchi |
| 2003/0226416 A1 | 12/2003 | Umemoto et al. |

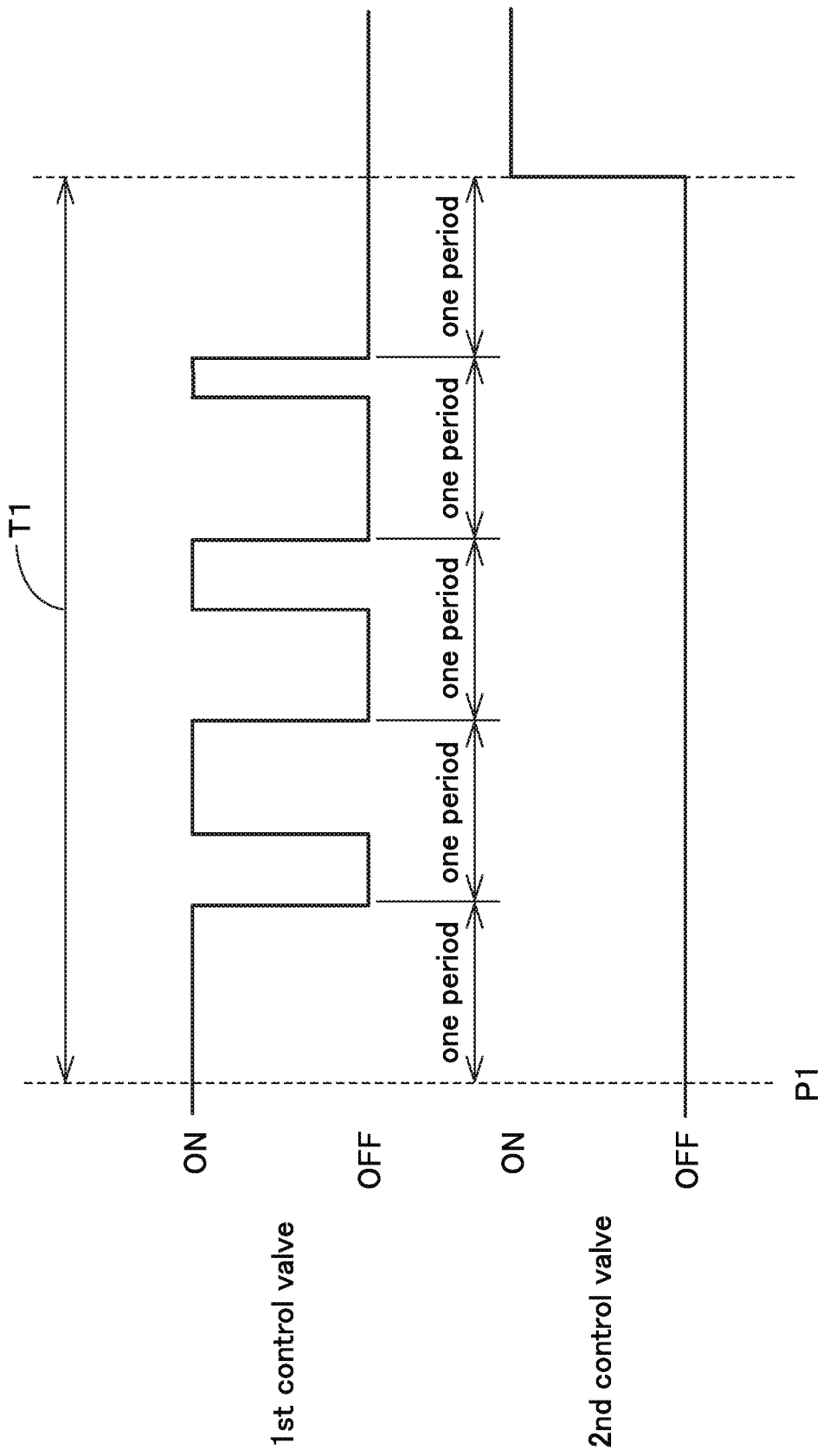

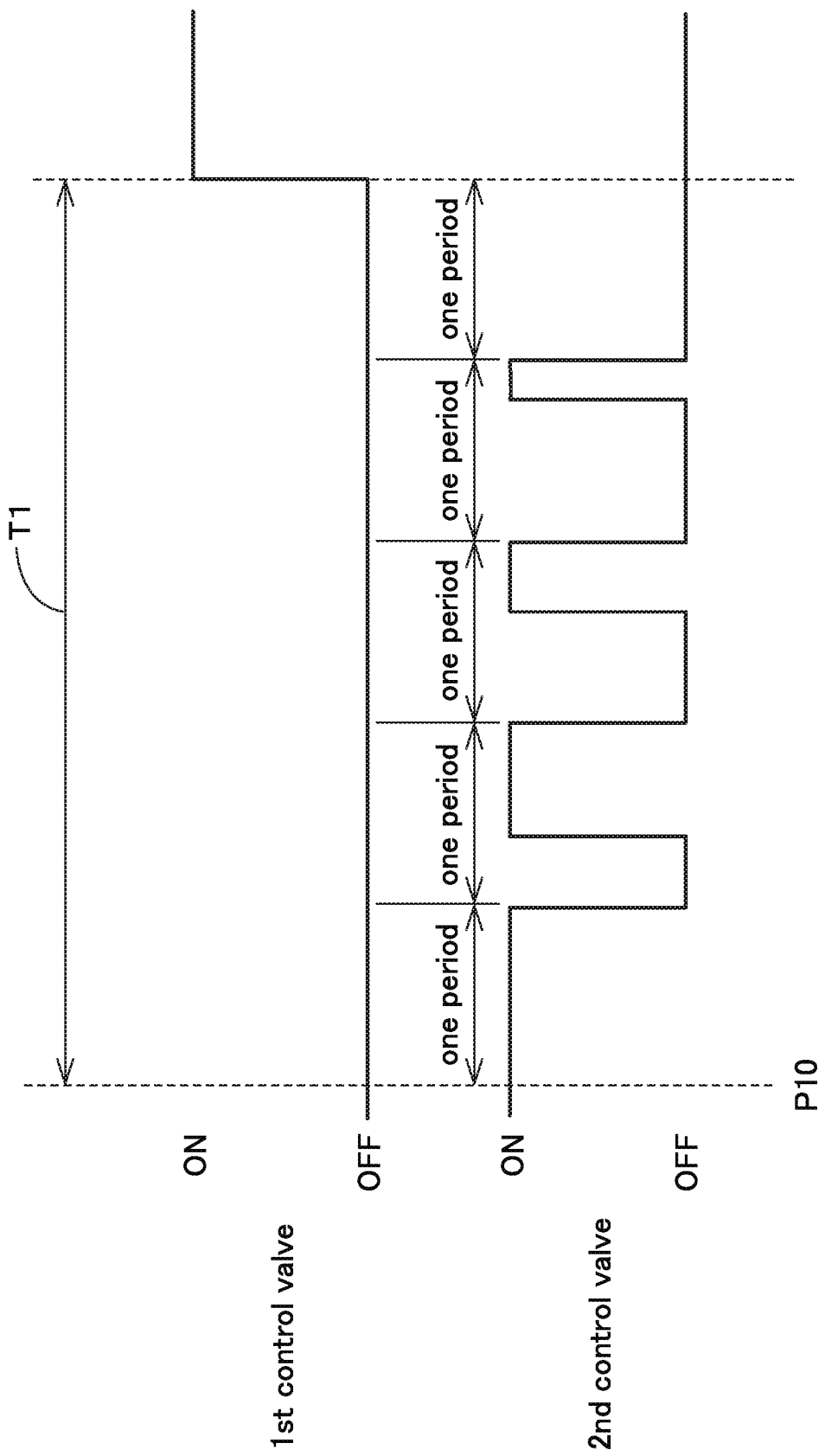

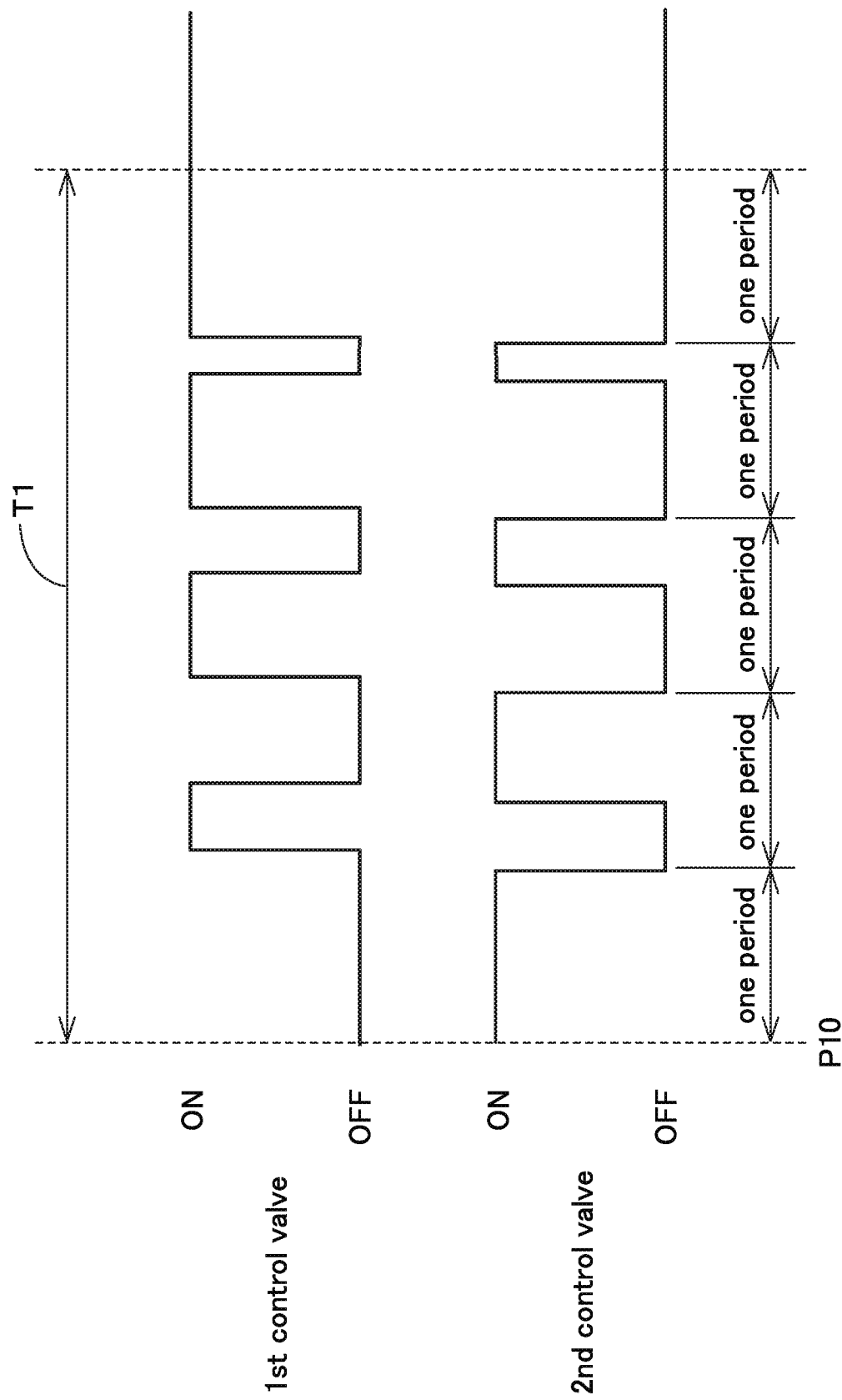

WORKING VEHICLE

CROSS-REFERENCE TO RELATED APPLICATIONS

The present application claims priority under 35 U.S.C. § 119 to Japanese Patent Application No. P2019-218408, filed Dec. 2, 2019 and to Japanese Patent Application No. P2020-110793, filed Jun. 26, 2020. The contents of these applications are incorporated herein by reference in their entirety.

BACKGROUND OF THE INVENTION

Field of the Invention

The present invention relates to a working vehicle such as a tractor.

Description of Related Art

The technology for switching the driving of the front wheels and the rear wheels in a working vehicle such as a tractor is known as shown in Japanese Unexamined Patent Publication No. 2005-263170. The working vehicle of Japanese Unexamined Patent Publication No. 2005-263170 is provided with a front wheel transmission mechanism capable of switching between a standard drive state in which the front wheels are driven at a circumference speed equivalent to that of the rear wheels and an acceleration drive state in which the front wheels are driven at a circumference speed faster than that of the rear wheels, and also is configured to automatically switch the front wheel transmission mechanism from the standard drive state to the acceleration drive state in synchronization with steering of the front wheels at a set angle or more.

In the working vehicle of Japanese Unexamined Patent Publication No. 2000-198362, a constant speed hydraulic clutch and an acceleration speed hydraulic clutch are supported on the transmission shaft of the front wheels and housed into a gear case, the gear case is mounted at a lower portion of the transmission case serving as the tractor body, and an electromagnetic valve for turning the hydraulic clutch on and off is mounted on a side surface of the gear case.

SUMMARY OF THE INVENTION

A working vehicle includes: a first traveling shaft to be rotated by power of a prime mover; a second traveling shaft to be rotated by the power of the prime mover and to transmit the power to a wheel; a first hydraulic clutch connected to the first traveling shaft; a second hydraulic clutch connected to the first traveling shaft separately from the first hydraulic clutch; a first gear mechanism to transmit, to the second traveling shaft, power from the first hydraulic clutch when the first hydraulic clutch is engaged and not to transmit, to the second traveling shaft, power from the first hydraulic clutch when the first hydraulic clutch is disengaged; a second gear mechanism to transmit, to the second traveling shaft, power from the second hydraulic clutch when the second hydraulic clutch is engaged and not to transmit, to the second traveling shaft, power from the second hydraulic clutch when the second hydraulic clutch is disengaged; a hydraulic control valve having an aperture to be changed in accordance with a control signal, the hydraulic control valve being configured to supply operation fluid to the first and second hydraulic clutches and drain from the operation fluid the first and second hydraulic clutches; and a controller device to change a duty ratio of the control signal when any one of the first hydraulic clutch and the second hydraulic clutch is switched from being engaged to being disengaged.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3A is a view illustrating a control signal with which four-wheel driving is switched to acceleration driving according to an embodiment of the present invention;

FIG. 3B is a view illustrating a control signal with which acceleration driving is switched to four-wheel driving according to an embodiment of the present invention;

FIG. 5B is a view illustrating a control signal with which acceleration driving is switched to four-wheel driving according to an embodiment of the present invention.

DESCRIPTION OF THE EMBODIMENTS

Figure 1:
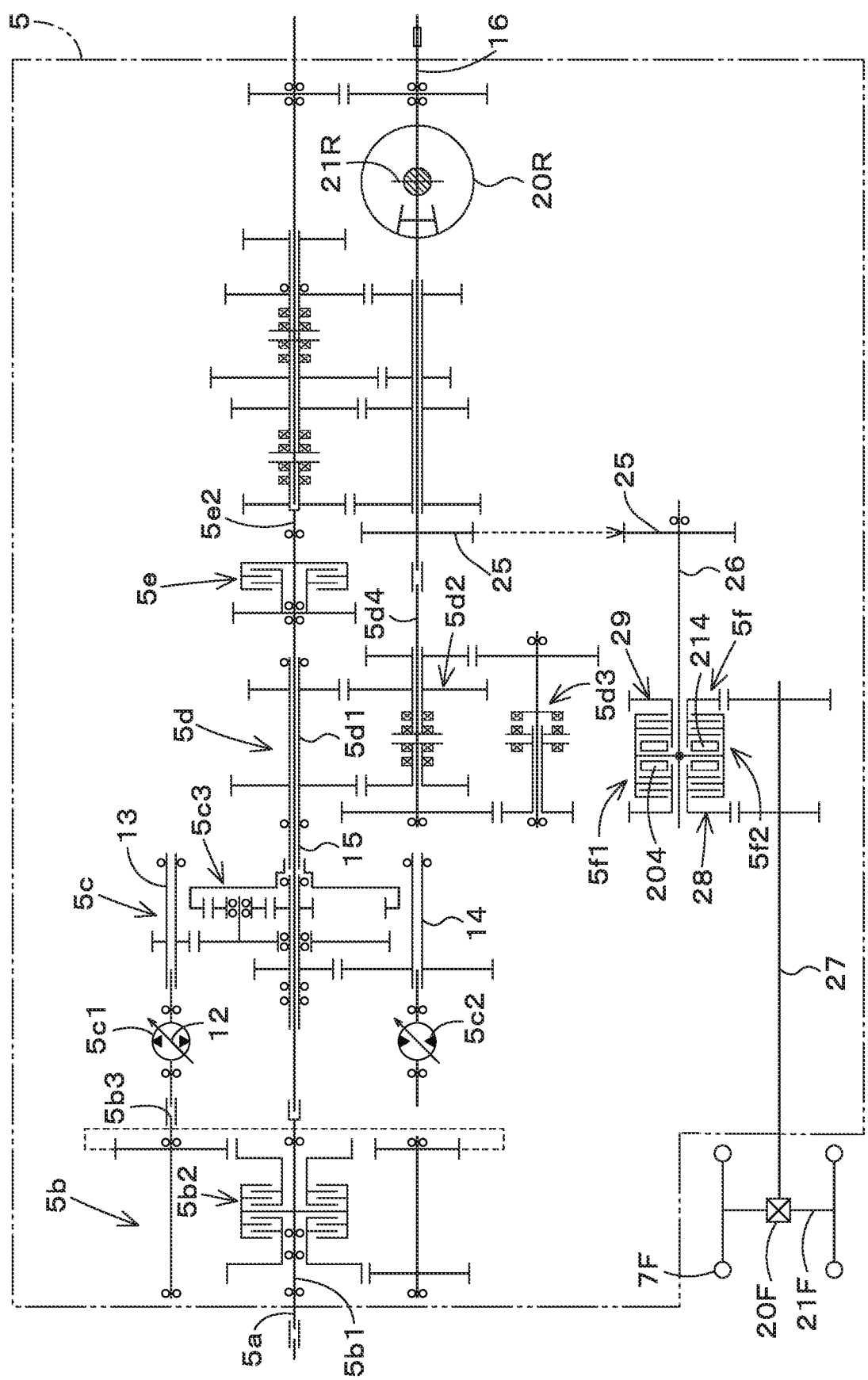
FIG. 1 is a configuration view of a speed-shifter device according to an embodiment of the present invention.

The embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

Figure 6:
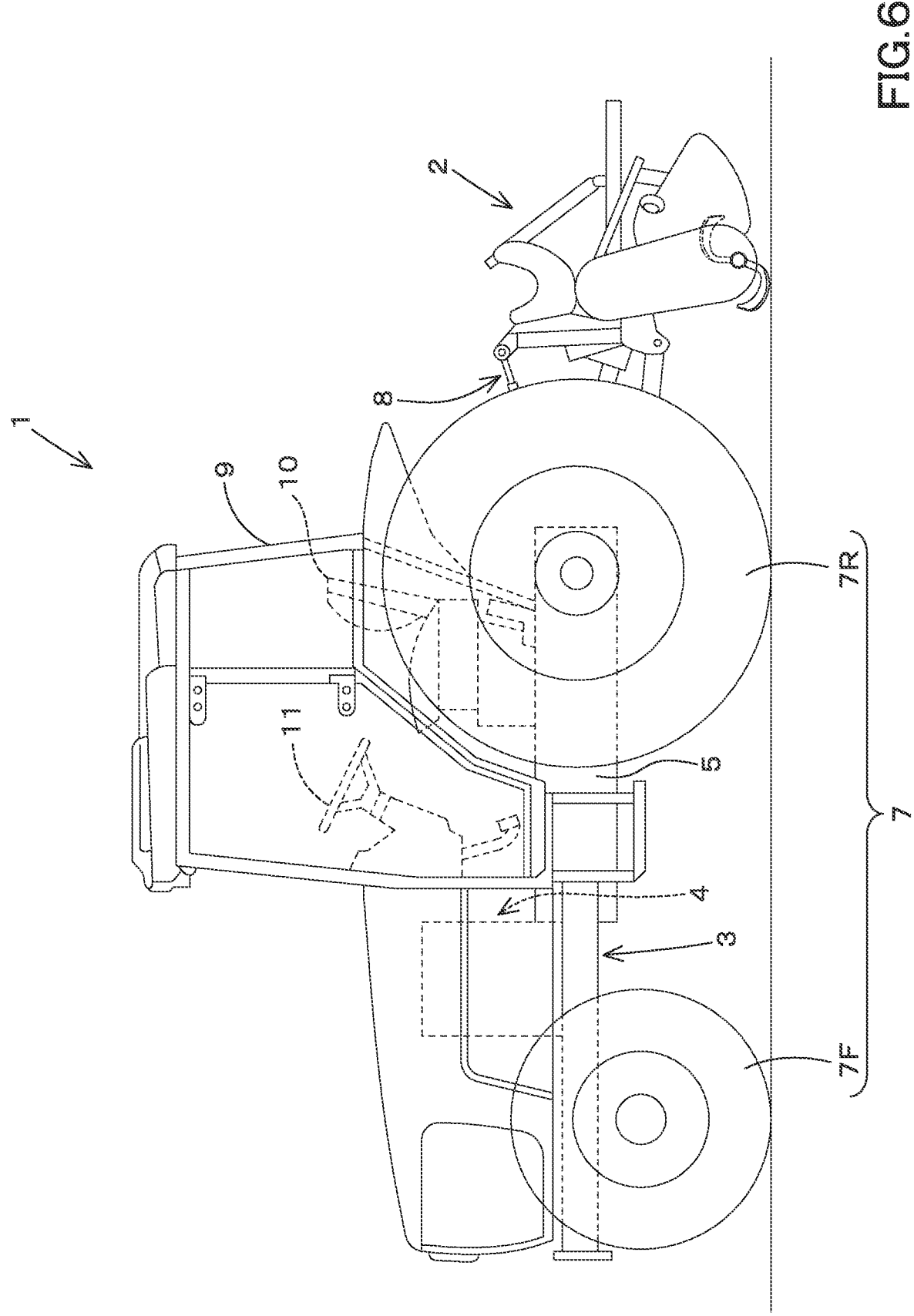
FIG. 6 is a whole view of a tractor according to an embodiment of the present invention.

FIG. 6 is a side view showing an embodiment of the working vehicle 1. In the case of this embodiment, the working vehicle 1 is a tractor. However, the working vehicle 1 is not limited to a tractor, and may be an agricultural machine (agricultural vehicle) such as a combine or a transplanter.

In the embodiment of the present invention, the front side of an operator seated on an operator seat 10 of the tractor (working vehicle) 1 is referred to as the front, the rear side of the operator is referred to as the rear, the left side of the operator is referred to as the left, and the right side of the operator is referred to as the right.

As shown in FIG. 6, the tractor 1 is provided with a traveling body 3 having a traveling device 7, a prime mover 4, a speed-shifter device 5, and a steering device 11. The traveling device 7 is a device having a front wheel 7F and a rear wheel 7R. The front wheels 7F may be of the tire type or crawler type.

The rear wheels 7R may also be of the tire or crawler type. The prime mover 4 is a gasoline engine, an internal combustion engine such as a diesel engine, an electric motor, and the like. In this embodiment, the prime mover 4 is a diesel engine.

The speed-shifter device 5 is capable of switching the propulsion of the traveling device 7 by shifting gears and also of switching the traveling device 7 forward or backward. A cabin 9 is provided in the traveling body 3, and an operator seat 10 is provided in the cabin 9.

A lifter device 8 is provided at the rear portion of the traveling body 3. The working device 2 can be attached to and removed from the lifter device 8. The lifter device 8 is capable of raising and lowering the mounted working device 2.

The working device 2 includes a cultivator device for cultivating, a fertilizer sprayer device for spraying fertilizer, a pesticide sprayer device for spraying pesticides, a harvester device for harvesting, a mower device for harvesting pastures and the like, a tedder device for diffusing pastures and the like, a grass rake device for collecting pastures and the like, a baler device for molding pastures and the like.

FIG. 6 shows an example of the cultivator device mounted as the working device 2.

As shown in FIG. 1, the speed-shifter device 5 is provided with a main shaft (propulsion shaft) $5a$, a shuttle portion $5b$, a main speed-shifter portion $5c$, a sub speed-shifter portion $5d$, a PTO clutch device $5e$, and a front speed-shifter portion $5f$. The propulsion shaft $5a$ is rotatably supported in the housing case of the speed-shifter device 5, and power from the crankshaft of the prime mover 4 is transmitted to the propulsion shaft $5a$.

The shuttle portion $5b$ has a shuttle shaft $5b1$ and a forward/backward switching portion $5b2$. The power from the propulsion shaft $5a$ is transmitted to the shuttle shaft $5b1$. The forward/backward switching portion $5b2$ includes, for example, a hydraulic clutch or the like, and switches the direction of rotation of the shuttle shaft $5b1$, that is, forward and backward movement of the tractor 1, by turning the hydraulic clutch on and off.

The main speed-shifter portion $5c$ is a stepless transmission mechanism that changes the input power to stepless. The stepless transmission mechanism includes a hydraulic pump $5c1$, a hydraulic motor $5c2$, and a planetary gear mechanism $5c3$. The hydraulic pump $5c1$ is rotated by power from the output shaft $5b3$ of the shuttle portion $5b$.

The hydraulic pump $5c1$ is, for example, a variable displacement pump having a swash plate 12, and the flow rate of hydraulic fluid output from the hydraulic pump $5c1$ can be changed by changing the angle (swash plate angle) of the swash plate 12. The hydraulic motor $5c2$ is a motor that is rotated by the hydraulic fluid output from the hydraulic pump $5c1$ via a fluid circuit such as a pipe.

The speed of the hydraulic motor $5c2$ can be changed by changing the swash plate angle of the hydraulic pump $5c1$ or by changing the power input to the hydraulic pump $5c1$.

The planetary gear mechanism $5c3$ is a mechanism including a plurality of gears and a power transmission shaft such as an input shaft and an output shaft, and includes an input shaft 13, wherein the power of the hydraulic pump $5c1$ is input, an input shaft 14, wherein the power of the hydraulic motor $5c2$ is input, and an output shaft 15, wherein the power is output. The planetary gear mechanism $5c3$ combines the power of the hydraulic pump $5c1$ and the power of the hydraulic motor $5c2$ and transmits the combined power to the output shaft 15.

Accordingly, according to the main speed-shifter portion $5c$, the power output to the sub speed-shifter portion $5d$ can be changed by changing the swash plate angle of the swash plate 12 of the hydraulic pump $5c1$, the number of revolutions of the prime mover 4, and the like, according to the main speed-shifter portion $5c$. Although the main speed-shifter portion $5c$ includes a stepless transmission mechanism, the main speed-shifter portion $5c$ may be a stepless transmission mechanism in which gears are used to change the speed.

The sub speed-shifter portion $5d$ is a transmission mechanism having a plurality of stepped gears (gears) for changing the power, and by changing the connection (engagement) of the plurality of gears accordingly, the power input to the sub speed-shifter portion $5d$ from the output shaft 15 of the planetary gear mechanism $5c3$ is changed and output (shifting). The sub speed-shifter portion $5d$ includes an input shaft $5d1$, a first transmission clutch $5d2$, a second transmission clutch $5d3$, and an output shaft (third traveling shaft) $5d4$.

The input shaft $5d1$ is a shaft to which the power of the output shaft 15 of the planetary gear mechanism $5c3$ is input, and the input power is input to the first gear shift clutch $5d2$ and the second gear shift clutch $5d3$ via gears and the like. By switching the engagement and disengagement of the first gear shift clutch $5d2$ and the second gear shift clutch $5d3$ respectively, the input power is changed and output to the output shaft $5d4$.

The power output to the output shaft $5d4$ is transmitted to the rear wheel differential device 20R. The rear wheel differential device 20R rotatably supports the rear axle 21R on which the rear wheel 7R is mounted. That is, the output shaft $5d4$ is a shaft that transmits the power of the prime mover 4 to the rear wheels 7R.

The PTO clutch device $5e$, for example, includes a hydraulic clutch, and the like, and is switched between a state in which the power of the propulsion shaft $5a$ is transmitted to the PTO propulsion shaft $5e2$ (engaged state) and a state in which the power of the propulsion shaft $5a$ is not transmitted to the PTO propulsion shaft $5e2$ (disengaged state) by turning the hydraulic clutch on and off. The power of the PTO propulsion shaft $5e2$ is transmitted to the PTO shaft 16 via a gear or other means.

As shown in FIG. 1, the front speed-shifter device $5f$ includes a first hydraulic clutch $5f1$, a second hydraulic clutch $5f2$, a first traveling shaft 26, a second traveling shaft 27, a first gear mechanism 28 and a second gear mechanism 29.

The first traveling shaft 26 is rotatably supported in the housing case and is an axis rotating under the power of the prime mover 4, and the first hydraulic clutch $5f1$ and the second hydraulic clutch $5f2$ are provided on the first traveling shaft 26. The second traveling shaft 26 is rotatably supported in the housing case and is rotatably rotatable by the power of the first traveling shaft 26.

Each of the first hydraulic clutch $5f1$ and the second hydraulic clutch $5f2$ includes a hydraulic clutch or the like that is switched into an engaged state and a disengaged state. The first hydraulic clutch $5f1$ is provided on the first traveling shaft 26, and the second hydraulic clutch $5f2$ is provided on the first traveling shaft 26 at a different position from the first hydraulic clutch $5f1$ (separately from the first hydraulic clutch $5f1$).

The first and second hydraulic clutches $5f1$ and $5f2$ are clutches through which the power from the prime mover 4 is transmitted, for example, the power of the output shaft $5d4$ of the sub speed-shifter portion $5d$ is transmitted through the gear 25 and the first traveling shaft 26, and the power transmitted to the first traveling shaft 26 can be input to each of the first and second hydraulic clutches 5/1 and 5/2.

The first gear mechanism 28 transmits the power input to the first hydraulic clutch 5/1 (power from the first hydraulic clutch 5/1) to the second traveling shaft 27 when the first hydraulic clutch 5/1 is in an engaged state, and does not transmit the power input to the first hydraulic clutch 5/1 (power from the first hydraulic clutch 5/1) to the second traveling shaft 27 when the first hydraulic clutch 5/1 is in a disengaged state.

The second gear mechanism 29 transmits the power input to the second hydraulic clutch 5/2 (power from the second hydraulic clutch 5/2) to the second traveling shaft 27 when the second hydraulic clutch 5/2 is in an engaged state, and does not transmit the power input to the second hydraulic clutch 5/2 (power from the second hydraulic clutch 5/2) to the second traveling shaft 27 when the second hydraulic clutch 5/2 is in a disengaged state.

The second traveling axle 27 is connected to the front wheel differential device 20F. The front wheel differential device 20F rotatably supports the front axle 21F to which the front wheels 7F are mounted. Thus, the power transmitted to the second traveling axle 27 is transmitted to the front wheels 7F.

According to the above, when the first hydraulic clutch 5/1 is in an engaged state and the second hydraulic clutch 5/2 is in a disengaged state, the power of the auxiliary gearbox 5d is transmitted to the front wheels 7F through the second hydraulic clutch 5/2. As a result, the tractor 1 (traveling body 3) is four-wheel drive (4WD) driven by the power of the front wheels 7F and the rear wheels 7R, and the rotation speed of the front wheels 7F and the rear wheels 7R is approximately the same (four-wheel drive constant speed state).

On the other hand, when the first hydraulic clutch 5/1 is in the disengaged state and the second hydraulic clutch 5/2 is in the engaged state, the tractor 1 (traveling body 3) becomes four-wheel drive and the rotational speed of the front wheels 7F is higher than the rotational speed of the rear wheels 7R (four-wheel acceleration drive state).

When the first and second hydraulic clutches 5/1 and 5/2 are connected, the tractor 1 (traveling body 3) is two-wheel drive (2WD) driven by the power of the rear wheels 7R, as the power of the sub speed-shifter portion 5d is not powered by the front wheels 7F.

Figure 2:
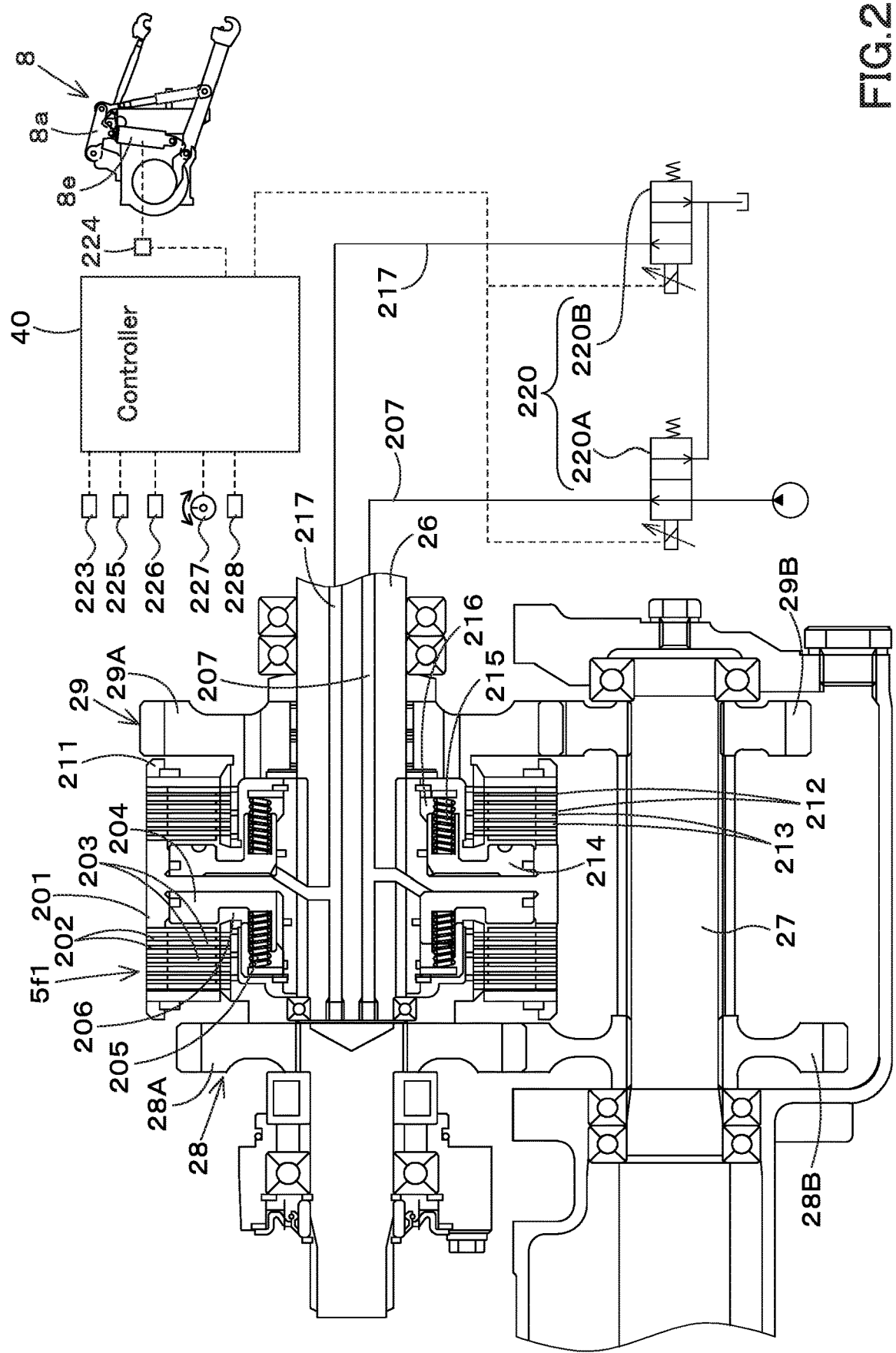
FIG. 2 is a view illustrating details of a first hydraulic clutch, a second hydraulic clutch, and a controller device according to an embodiment of the present invention.

FIG. 2 shows a detailed view of the front speed-shifter portion 5f.

The first hydraulic clutch 5/1 has a housing 201, a driven plate 202, a drive plate 203, and a piston 204. The housing 201 rotates with the rotation of the first driving axis 26.

The driven plate 202 is provided on the housing 201 side. The drive plate 203 is provided between the driven plates 202. The piston 204 is a piston that can be moved in the housing 201 to a connection side where the driven plate 202 and the drive plate 203 are pressurized and to a disconnection side where the driven plate 202 and the drive plate 203 are disengaged.

The piston 204 is actuated towards the disconnection side by the spring 205. The housing 201 has a supply-drain chamber 206, and the supply-drain chamber 206 is connected to a fluid line 207 formed in the first traveling shaft 26. When hydraulic fluid is supplied to the supply-drain chamber 206 through the fluid line 207, the piston 204 is moved by the pressure of the hydraulic fluid to the connection side against the force of the spring 205.

When the hydraulic fluid in the supply-drain chamber 206 is discharged through the fluid line 207, the piston 204 moves to the disconnection side by the force of the spring 205.

The first gear mechanism 28 has a plurality of first gears 28A and 28B that engage each other. The first gear 28A is rotatably supported relative to the first traveling axis 26. The first gear 28B is integrally rotatably provided on the second travel axis 27. The gear ratio of the first gear 28A and 28B is approximately 1:1 and is set so that when the power of the first hydraulic clutch 5/1 is transmitted to the first gear mechanism 28, the number of revolutions of the first traveling axis 26 and the second traveling axis 27 is approximately the same.

The second hydraulic clutch 5/2, like the first hydraulic clutch 5/1, has a housing 211, a driven plate 212, a drive plate 213, and a piston 214. The housing 211 is formed integrally with the housing 201 and rotates with the rotation of the first traveling axis 26.

The driven plate 212 is provided on the housing 211 side. The drive plate 213 is provided between the driven plates 212. The piston 214 is a piston that can be moved in the housing 211 to a connection side where the driven plate 212 and the drive plate 213 are pressurized and to a disconnection side where the driven plate 212 and the drive plate 213 are disconnected.

The piston 214 is actuated towards the disconnection side by the spring 215. The housing 211 has a supply-drain chamber 216, and the supply-drain chamber 216 is connected to a fluid line 217 formed in the first traveling shaft 26. When hydraulic fluid is supplied to the supply-drain chamber 216 through the fluid line 217, the piston 214 is moved by the pressure of the hydraulic fluid to the connection side against the force of the spring 215. When the hydraulic fluid in the feed and discharge chamber 216 is discharged through the fluid line 217, the piston 214 moves to the disconnection side by the force of the spring 215.

The second gear mechanism 29 has a plurality of second gears 29A and 29B that engage each other. The second gear 29A is engaged in spline to the first traveling shaft 26 with relative rotational freedom. The second gear 29B is integrally rotatably provided on the second traveling shaft 27. The gear ratios of the second gear 29A and 29B are set such that the gear ratios are higher than the number of revolutions of the second traveling axis 27 by the plurality of first gears 28A and 28B.

That is, the gear ratio is set such that the second gears 29A and 29B causes the speed of the front wheels 7F to be abbreviatedly doubled by the second gears 29A and 29B as compared to the speed of the front wheels 7F through the second traveling axis 27 by the first gears 28A and 28B. The gear ratios of the second gears 29A and 29B are set such that the number of revolutions of the front wheels 7F is abbreviatedly doubled over the number of revolutions of the rear wheels 7R.

The tractor 1 is provided with a hydraulic control valve 220. The hydraulic control valve 220 is a valve for supplying and outputting hydraulic fluid to the first hydraulic clutch 5/1 and the second hydraulic clutch 5/2. The hydraulic control valve 220 is a valve whose opening is changed by a control signal.

The hydraulic control valve 220 includes a first control valve 220A and a second control valve 220B. The first control valve 220A and the second control valve 220B are solenoid valves. The first control valve 220A is connected to the fluid line 207 and the second control valve 220B is connected to the fluid line 217.

The first control valve 220A and the second control valve 220B are connected to the supply fluid line 221, which supplies hydraulic fluid from the hydraulic pump, and to the drain fluid line 222, which discharges the hydraulic fluid.

As shown in FIG. 2, the tractor 1 is provided with a controller device 40. The controller device 40 is a device that performs various controls of the tractor 1, such as lifting and lowering control, clutch control, and the like.

In the lifting and lowering control, the controller device 40 switches the control valve 224 to the lifting position by magnetizing the solenoid of the control valve 224 when the command to lift is given by operating the lifting operation tool 223. This causes the lift cylinder 8e of the lifter device 8 to extend and the rear end portion of the lift arm 8a (the end portion of the working device 2 side) to rise.

In the lifting and lowering control, the controller 40 switches the control valve 224 to the lowered position by magnetizing the solenoid of the control valve 224 when the lifting actuator 223 is operated in the direction of lowering (downward side). This causes the lift cylinder 8e of the lifter device 8 to shorten, and the rear end portion of the lift arm 8a (the end portion of the working device 2 side) to lower.

In the clutch control, the controller 40 controls each of the first hydraulic clutch 5/1 and the second hydraulic clutch 5/2 according to the switching of the switching device 226. The switching device 226 is, for example, a switch capable of being switched to three positions, a first position corresponding to the two-wheel drive, a second position corresponding to the four-wheel drive, and a third position corresponding to the acceleration speed drive.

The switching device 226, in the first position, commands the controller device 40 for two-wheel drive, in the second position, commands the controller device 40 for four-wheel drive, and in the third position, commands the controller device 40 for acceleration speed drive. The switching device 226 may be three on/off switches (a first switch, a second switch, and a third switch).

In this case, when the first switch is ON, the two-wheel drive is commanded to the controller device 40, when the second switch is ON, the four-wheel drive is commanded to the controller device 40, and when the third switch is ON, in the third position, the acceleration speed drive is commanded to the controller device 40. When two or more of the first, second and third switches are ON, the command of the switch that is ON first takes precedence.

In the clutch control, when the switching device 226 is switched to two-wheel drive, the controller device 40 puts the first and second hydraulic clutches 5/1 and 5/2 into a disengaged state by demagnetizing the solenoids of the first control valve 220A and the second control valve 220B by a control signal.

In the clutch control, when the switching device 226 is switched to 4-wheel drive in the clutch control, the controller device 40 makes the first hydraulic clutch 5/1 connected by magnetizing the solenoid of the first control valve 220A by a control signal, and makes the second hydraulic clutch 5/2 disconnected by de-magnetizing the solenoid of the second control valve 220B by a control signal.

In the clutch control, the controller device 40 makes the first hydraulic clutch 5/1 disengaged by de-magnetizing the solenoid of the first control valve 220A by a control signal and makes the second hydraulic clutch 5/2 engaged by magnetizing the solenoid of the second control valve 220B by a control signal when the switching device 226 is switched to the acceleration speed drive.

Here, the controller device 40 changes the duty ratio of the control signal when either one of the first hydraulic clutch 5/1 and the second hydraulic clutch 5/2 is switched from the engaged state to the disengaged state, that is, when the solenoid is switched from a magnetized state to the demagnetized state, that is, when the solenoid is magnetized. In particular, the controller device 40 changes the duty ratio of the control signal when switching the traveling body 3 from a state in which the traveling body 3 is in four-wheel drive to the acceleration speed drive, or when switching the traveling body 3 from a state in which the traveling body 3 is in four-wheel drive to a two-wheel drive.

As shown in FIG. 3A, suppose, for example, that in the state of 4-wheel drive in which the solenoid of the first control valve 220A is magnetized (ON) and the solenoid of the second control valve 220B is demagnetized (OFF), an operation is made to switch the solenoid to the speed-up drive at time P1 (to switch the switching device 226 from 4-wheel drive to the acceleration drive).

In this case, in demagnetizing (turning off) the solenoid of the first control valve 220A, the control device 40 gradually reduces the duty ratio, which is the interval between the ON/OFF of the square wave of the control signal from time P1 to the ON/OFF of the control signal from 100% with each passage of time, and after the elapse of the predetermined time T1, the duty ratio is 0%, that is, the control signal is continuously turned off.

The controller device 40 magnetized the solenoid of the second control valve 220B after the duty ratio is set to 0%. That is, the controller device 40 switches the solenoid of the second control valve 220B from the demagnetized state to the magnetized state after a predetermined time T1 after switching the switching device 226 from the four-wheel drive to the acceleration speed drive.

Figure 4A:
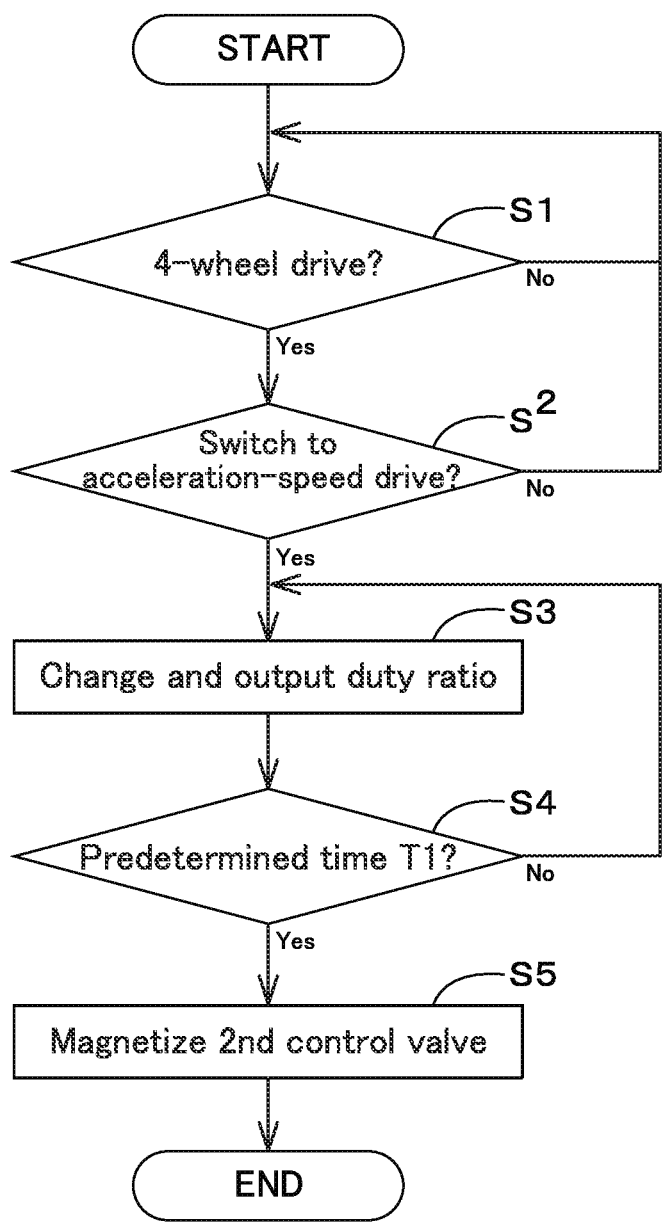
FIG. 4A is a view illustrating an operation flow in which four-wheel driving is switched to acceleration driving according to an embodiment of the present invention.

FIG. 4A is the flow of operation of the controller 40 when switching from the four-wheel drive to the acceleration speed drive.

The controller device 40 determines whether or not it is in the four-wheel drive state (step S1).

In the state of 4-wheel drive (step S1, Yes), determine whether or not the vehicle has been switched to the acceleration speed drive (step S2).

When switched to the acceleration speed drive (step S2, Yes), the controller 40 outputs a control signal to the first control valve 220A while changing the duty ratio (step S3).

The controller 40 determines whether the elapsed time since the switch to the acceleration speed drive has reached the predetermined time T1 (step S4).

When the elapsed time reaches the predetermined time T1 (step S4, Yes), a control signal to magnetize the solenoid of the second control valve 220B is output (step S5).

As shown in FIG. 3B, suppose, for example, that in the state of acceleration speed drive in which the solenoid of the first control valve 220A is demagnetized (OFF) and the solenoid of the second control valve 220B is excited (ON), an operation is made to switch the solenoid to 4-wheel drive at time P10 (to switch the switching device 226 from the acceleration speed drive to the 4-wheel drive).

In this case, in demagnetizing (turning off) the solenoid of the second control valve 220B, the controller device 40 gradually reduces the duty ratio, which is the interval between the square wave on and off of the control signal from time P10 to the square wave on and off of the control signal from time P10, from 100% to gradually reduce the duty ratio to 0%, that is, the control signal is continuously turned off after the elapse of the predetermined time T1.

The controller device 40 magnetizes the solenoid of the first control valve 220A after the duty ratio is set to 0%. That is, the controller device 40 switches the solenoid of the first control valve 220A from the demagnetized state to the excited state after a predetermined time T1 after the switching device 226 switches from the acceleration speed drive to the four-wheel drive.

Figure 4B:
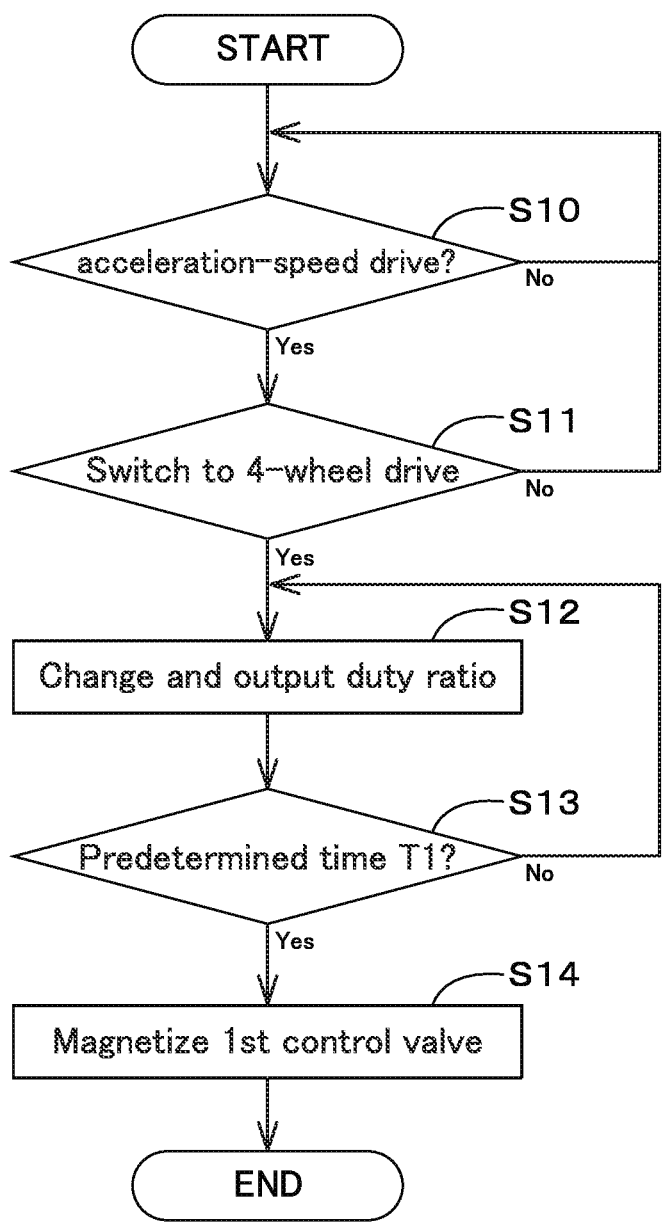
FIG. 4B is a view illustrating an operation flow in which acceleration driving is switched to four-wheel driving according to an embodiment of the present invention.

FIG. 4B is the flow of operation of the controller device 40 when switching from the acceleration speed drive to the four-wheel drive.

The controller device 40 determines whether or not it is in a state of acceleration speed drive (step S10).

In the state of the acceleration speed drive (step S10, Yes), determine whether or not the vehicle has been switched to 4-wheel drive (step S11).

When switched to the four-wheel drive (step S11, Yes), the controller 40 outputs a control signal to the second control valve 220B while changing the duty ratio (step S12).

The controller 40 determines whether the elapsed time since the switch to the four-wheel drive has reached the predetermined time T1 (step S13).

When the elapsed time reaches the predetermined time T1 (step S13, Yes), a control signal to excite the solenoid of the first control valve 220A is output (step S14).

In the above-mentioned embodiment, the duty ratio of the control signal is gradually reduced during the predetermined time T1, but the time to gradually reduce the duty ratio (the time to reduce the duty ratio from 100% to 0%) may be changed according to the temperature of the hydraulic fluid.

Now, in FIG. 3A as described above, when switching from the 4-wheel drive to the acceleration speed drive, the duty ratio of the control signal (first control signal) output to the first control valve 220A at the predetermined time T1 is gradually reduced so that the duty ratio of the control signal (first control signal) output to the second control valve 220B at the predetermined time T1 is gradually reduced from 100% to 0% as time passes, and then the control signal (second control signal) was started up from OFF to ON. However, instead, the duty ratio of the second control signal may be gradually increased while the duty ratio of the first control signal is gradually reduced.

Figure 5A:
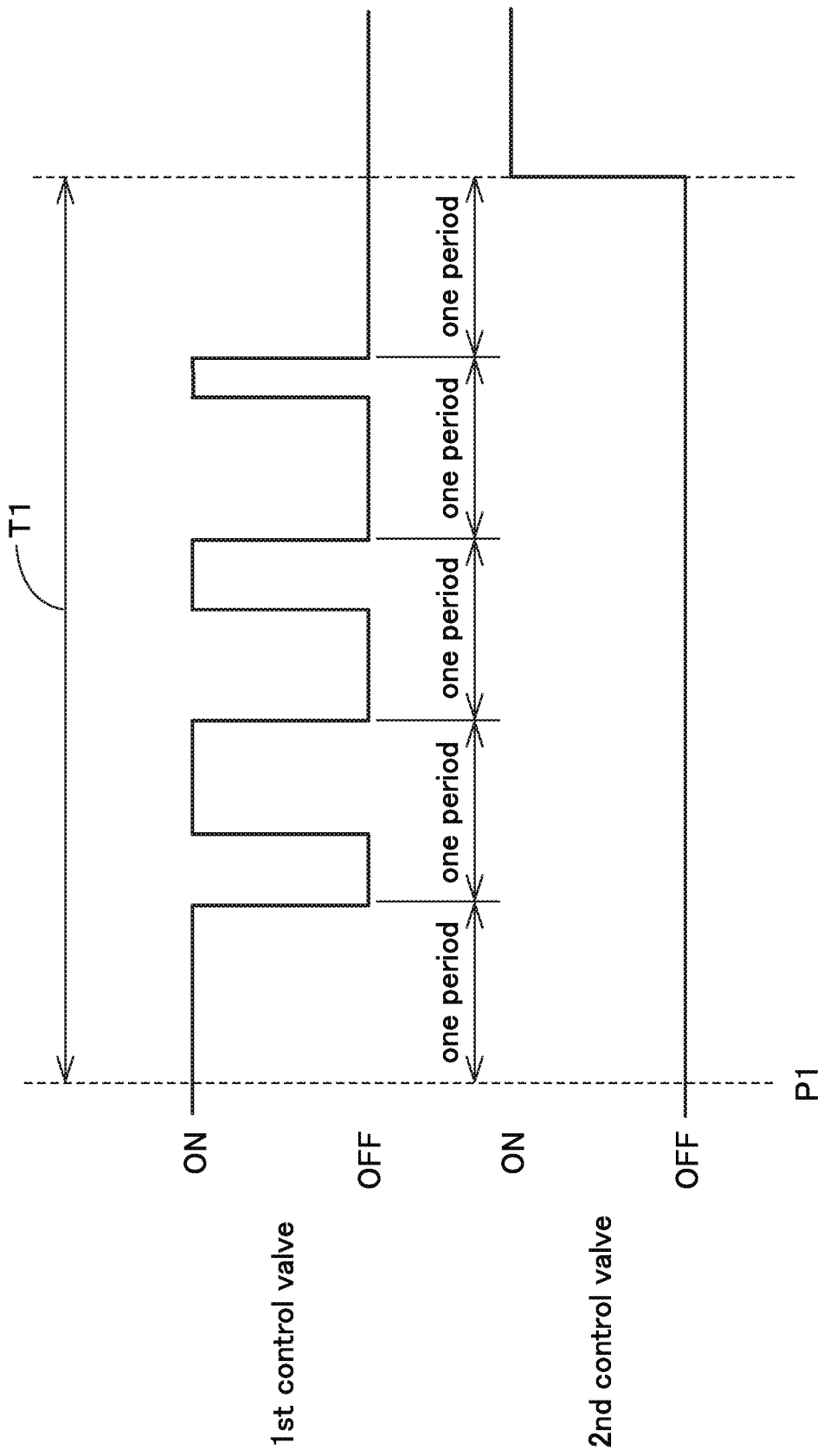
FIG. 5A is a view illustrating a control signal with which four-wheel driving is switched to acceleration driving according to an embodiment of the present invention.

In detail, as shown in FIG. 5A, when there is an operation to switch from the 4-wheel drive to increased speed drive at time P1, the controller device 40, as in FIG. 3A, gradually reduces the duty ratio of the first control signal from 100% to 0% at the predetermined time T1, while gradually reducing the duty ratio of the second control signal from 0% to increase the duty ratio to 100%. The timing of setting the duty ratio of the second control signal to 100% may be after the predetermined time T1.

In other words, the section for decreasing the duty ratio of the first control signal and the section for increasing the duty ratio of the second control signal need only overlap, and the timing for increasing or decreasing the duty ratio may be off from each other.

In FIG. 3B described above, when switching from the acceleration speed drive to the four-wheel drive, the duty ratio of the second control signal at the predetermined time T1 is gradually reduced from 100% to 0% with each passing time, and then the first control signal is started up from OFF to ON. However, instead, the duty ratio of the first control signal may be gradually increased while the duty ratio of the second control signal is being gradually reduced.

In detail, as shown in FIG. 5B, as shown in FIG. 5B, when there is an operation to switch from increased speed drive to 4-wheel drive at time P1, the controller device 40, as in FIG. 3B, makes the duty ratio of the second control signal at the predetermined time T1 gradually decrease from 100% to 0%, while the duty ratio of the first control signal is gradually reduced from 0% to the duty ratio is increased to 100%. The timing for setting the duty ratio of the first control signal to 100% may be after the predetermined time T1.

In other words, the section in which the duty ratio of the first control signal is increased and the section in which the duty ratio of the second control signal is decreased need only overlap, and the timing for increasing or decreasing the duty ratio may be off from each other.

As shown in FIG. 2, the controller device 40 is connected to the temperature detector device 225, which detects the temperature of the hydraulic fluid. In the temperature detector device 225, the controller device 40, for example, sets a predetermined time (duty ratio decreasing time) T1 to a maximum value when the temperature of the hydraulic fluid (fluid temperature) is below a threshold value (for example, minus 15° C. or less), and shortens the duty ratio reduction time T1 as the temperature gradually increases.

In this case, a switch (setting switch) 228 may be provided at a position (around the operator seat 10) where the operator can operate the switch (setting switch) 228 to change the duty ratio reduction time T1 according to the temperature of the hydraulic fluid.

The setting switch 228 is a switch that can be switched ON/OFF, and when ON, the controller device 40 automatically changes the duty ratio reduction time T1 according to the fluid temperature detected by the temperature detector device 225; when OFF, the controller device 40 changes the duty ratio reduction time T1 according to the fluid temperature detected by the temperature detector device 225. The duty ratio reduction time T1 is not changed and the duty ratio reduction time T1 is fixed at a predetermined time.

Alternatively, as shown in FIG. 2, an adjuster dial 227 may be provided on the controller device 40, and the duty ratio reduction time T1 may be changed by the driver by the rotatable adjuster dial 227. When the index portion 227A of the adjuster dial 227 is in the reference position, the duty ratio reduction time T1 is set to a predetermined value (the default value).

When the indicator portion 227A is rotated from the reference position to one side, the controller device 40 shortens the duty ratio reduction time T1 according to the amount of operation, and when the indicator portion 227A is rotated from the reference position to the other side, the duty ratio reduction time T1 is increased according to the amount of operation.

The working vehicle 1 includes the first traveling shaft 26 to be rotated by power of the prime mover, the second traveling shaft 27 to be rotated by the power of the prime mover and to transmit the power to a wheel, the first hydraulic clutch 5/1 connected to the first traveling shaft 26, the second hydraulic clutch 5/2 connected to the first traveling shaft 26 separately from the first hydraulic clutch 5/1, the first gear mechanism 28 to transmit, to the second traveling shaft 27, power from the first hydraulic clutch 5/1 when the first hydraulic clutch 5/1 is engaged and not to transmit, to the second traveling shaft 27, power from the first hydraulic clutch 5/1 when the first hydraulic clutch 5/1 is disengaged, the second gear mechanism 29 to transmit, to the second traveling shaft 27, power from the second hydraulic clutch 5/2 when the second hydraulic clutch 5/2 is engaged and not to transmit, to the second traveling shaft 27, power from the second hydraulic clutch 5/2 when the second hydraulic clutch 5/2 is disengaged, the hydraulic control valve 220 having an aperture to be changed in accordance with a control signal, the hydraulic control valve 220 being configured to supply operation fluid to the first and second hydraulic clutches 5/2 and drain from the operation fluid the first and second hydraulic clutches 5f2, and the controller device 40 to change a duty ratio of the control signal when any one of the first hydraulic clutch 5f1 and the second hydraulic clutch 5f2 is switched from being engaged to being disengaged.

According to this configuration, in a mechanism that transmits power to a wheel by means of the first gear mechanism 28 and the second gear mechanism 29 by switching the first hydraulic clutch 5f1 and the second hydraulic clutch 5f2 from the engaged state to the disengaged state, the first hydraulic clutch 5f1 and the second hydraulic clutch 5f2 are switched from the engaged state to the disengaged state. Since the duty ratio of the control signal is changed in the case of switching, the half-clutch state can be prolonged, that is, a sudden change from the engaged state to the disengaged state can be prevented.

In other words, the engagement of the first gear mechanism 28 and the second gear mechanism 29 at the same time can be prevented. This allows for smooth engagement and disengagement of the hydraulic clutch with as little shifting shock as possible.

The first gear mechanism 28 has a plurality of first gears 28A and 28B that engage each other, and the second gear mechanism 29 has a plurality of second gears 29A and 29B that engage each other, and the plurality of second gears 29A and 29B have gear ratios set such that the gear ratios are higher than the number of revolutions of the second traveling axis 27 when the second traveling axis 27 is rotated by the plurality of first gears 28A and 28B.

According to this configuration, when the second hydraulic clutch 5f2 is connected, the hydraulic clutch can be engaged and disengaged smoothly while suppressing the shifting shock as much as possible in that the rotational speed of the wheel can be increased as compared to the case of engaging the first hydraulic clutch 5f2.

The working vehicle 1 is provided with the third traveling shaft 5d4, which is rotated by the power of the prime mover to transmit power to the rear wheels 7R, and the second traveling shaft 27 is the shaft that transmits power to the front wheels 7F.

According to this configuration, by setting the first and second hydraulic clutches 5f1 and 5f2 in the engaged state, the hydraulic clutches can be engaged and disengaged smoothly while suppressing gear shift shock as much as possible in a situation where the 4-wheel drive driven by front wheels 7F and rear wheels 7R or the 2-wheel drive driven only by rear wheels 7R can be used.

The working vehicle 1 is provided with the switching device 226 that switches the traveling body 3 to the two-wheel drive, the four-wheel drive and the acceleration speed drive, and when switched to the two-wheel drive, the controller device 40 sets the first and second hydraulic clutches 5f1 and 5f2 to the disengaged state by the control signal, and when switched to the four-wheel drive, the controller device 40 sets the first hydraulic clutch 5f1 to the engaged state and sets the second hydraulic clutch 5f2 to the disengaged state in accordance with the control signal, and when the drive is switched to the acceleration speed driving, the first hydraulic clutch 5f1 is disconnected and the second hydraulic clutch 5f2 is connected in accordance with the control signal.

According to this configuration, the hydraulic clutch can be engaged and disengaged smoothly with as little shifting shock as possible while being able to switch to either the two-wheel drive, the four-wheel drive or the acceleration speed drive by the switching device 226.

The controller 40 gradually reduces the duty ratio of the control signal when switching the first hydraulic clutch 5f1 from the engaged state to the disengaged state. In the case of switching from the four-wheel drive to the acceleration speed drive, the shifting shock can be controlled.

For example, in the agricultural field, when the working vehicle 1 is turned in a situation where the working vehicle is working with the 4-wheel drive in the agricultural field, the shifting shock of switching to the acceleration speed drive can be suppressed while preventing the agricultural field from being damaged by the switchover.

The controller device 40 gradually reduces the duty ratio of the control signal when switching the second hydraulic clutch 5f2 from the engaged state to the disengaged state. In the case of switching from an increased speed drive to the four-wheel drive, the shifting shock can be suppressed.

For example, when the working vehicle 1 is turned in the agricultural field by the acceleration speed drive and then the working vehicle 1 is switched to the 4-wheel drive for work in the agricultural field, the shifting shock of the switchover can be controlled while preventing the field from being damaged by the switchover.

When the first hydraulic clutch 5f1 is disengaged and the second hydraulic clutch 5f2 is engaged in accordance with the control signal, the control device 40 gradually reduces the duty ratio of the control signal (first control signal) corresponding to the first hydraulic clutch 5f1 and gradually increases the duty ratio of the control signal (second control signal) corresponding to the second hydraulic clutch 5f2.

According to this configuration, shifting shocks can be suppressed when switching from the four-wheel drive to increased speed drive.

When the second hydraulic clutch 5f2 is disengaged and the first hydraulic clutch 5f1 is engaged by a control signal, the duty ratio of the control signal corresponding to the second hydraulic clutch 5f2 is gradually reduced and the duty ratio of the control signal corresponding to the first hydraulic clutch 5f1 is gradually increased.

According to this configuration, shifting shocks can be suppressed when switching from increased speed drive to the four-wheel drive.

The working vehicle 1 is provided with the temperature detector device 225 capable of detecting the temperature of the hydraulic fluid, and the controller device 40 changes the duty ratio according to the temperature of the hydraulic fluid detected by the temperature detector device 225.

According to this configuration, when the temperature (oil temperature) of the hydraulic fluid is low, the pressure of the hydraulic fluid supplied to the first hydraulic clutch 5f1 and the second hydraulic clutch 5f2 is difficult to release the pressure of the hydraulic fluid because the viscosity of the hydraulic fluid is high, while when the temperature (fluid temperature) of the hydraulic fluid is high, the viscosity of the hydraulic fluid is low, and thus the pressure of the hydraulic fluid supplied to the first hydraulic clutch 5f1 and the second hydraulic clutch 5f2 is difficult to release. In a situation where the pressure of the hydraulic fluid supplied to the hydraulic clutch 5f2 is easily released and the shifting shock is susceptible to change depending on the temperature, the shifting can be kept constant regardless of the temperature of the hydraulic fluid.

In other words, when either one of the first hydraulic clutch 5f1 and the second hydraulic clutch 5f2 is switched from the engaged state to the disengaged state and the other is switched from the disengaged state to the engaged state, the time for both clutches to be in the disengaged state can be minimized by fluid temperature.

The working vehicle 1 is provided with the adjuster dial 227 that can be operated manually, and the controller device 40 changes the duty ratio according to the amount of operation of the adjuster dial 227.

According to this configuration, when either one of the first hydraulic clutch 5/1 and the second hydraulic clutch 5/2 is switched from the engaged state to the disengaged state and the other is switched from the disengaged state to the engaged state, the time in which both clutches are in the disengaged state can be minimized manually as much as possible.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working vehicle comprising:
   a first traveling shaft to be rotated by power of a prime mover;
   a second traveling shaft to be rotated by the power of the prime mover and to transmit the power to a wheel;
   a first hydraulic clutch connected to the first traveling shaft;
   a second hydraulic clutch connected to the first traveling shaft separately from the first hydraulic clutch;
   a first gear mechanism to transmit, to the second traveling shaft, power from the first hydraulic clutch when the first hydraulic clutch is engaged and not to transmit, to the second traveling shaft, power from the first hydraulic clutch when the first hydraulic clutch is disengaged;
   a second gear mechanism to transmit, to the second traveling shaft, power from the second hydraulic clutch when the second hydraulic clutch is engaged and not to transmit, to the second traveling shaft, power from the second hydraulic clutch when the second hydraulic clutch is disengaged;
   a hydraulic control valve having an aperture to be changed in accordance with a control signal, the hydraulic control valve being configured to supply operation fluid to the first and second hydraulic clutches and drain from the operation fluid the first and second hydraulic clutches; and
   a controller device to gradually reduce a duty ratio of the control signal when any one of the first hydraulic clutch and the second hydraulic clutch is switched from being engaged to being disengaged.

2. The working vehicle according to claim 1, comprising a temperature detector device to detect temperature of operation fluid, wherein
   the controller device changes the duty ratio based on the temperature of operation fluid detected by the temperature detector device.

3. The working vehicle according to claim 1, comprising an adjuster dial to be manually operated, wherein
   the controller device changes the duty ratio based on operation of the adjuster dial.

4. The working vehicle according to claim 1, wherein
   the first gear mechanism includes a plurality of first gears engaged each other,
   the second gear mechanism includes a plurality of second gears engaged each other, and
   the plurality of second gears has a gear ratio providing a rotation speed of the second traveling shaft higher than another rotation speed of the second traveling shaft rotated with the plurality of first gears.

5. The working vehicle according to claim 4, comprising a temperature detector device to detect temperature of operation fluid, wherein
   the controller device changes the duty ratio based on the temperature of operation fluid detected by the temperature detector device.

6. The working vehicle according to claim 4, comprising an adjuster dial to be manually operated, wherein
   the controller device changes the duty ratio based on operation of the adjuster dial.

7. The working vehicle according to claim 4, comprising a third traveling shaft to be rotated by the power of the prime mover and to transmit the power to a rear wheel, wherein
   the second traveling shaft transmits the power to a front wheel.

8. The working vehicle according to claim 7, comprising a temperature detector device to detect temperature of operation fluid, wherein
   the controller device changes the duty ratio based on the temperature of operation fluid detected by the temperature detector device.

9. The working vehicle according to claim 7, comprising an adjuster dial to be manually operated, wherein
   the controller device changes the duty ratio based on operation of the adjuster dial.

10. The working vehicle according to claim 7, comprising:
    a traveling body; and
    a switching device to switch driving of the traveling body between two-wheel driving, four-wheel driving, and acceleration driving, wherein
    the controller device disengages the first hydraulic clutch and the second hydraulic clutch in the two-wheel driving in accordance with the control signal, engages the first hydraulic clutch and disengages the second hydraulic clutch in the four-wheel driving in accordance with the control signal, and disengages the first hydraulic clutch and engages the second hydraulic clutch in the acceleration driving in accordance with the control signal.

11. The working vehicle according to claim 10, comprising a temperature detector device to detect temperature of operation fluid, wherein
    the controller device changes the duty ratio based on the temperature of operation fluid detected by the temperature detector device.

12. The working vehicle according to claim 10, comprising an adjuster dial to be manually operated, wherein
    the controller device changes the duty ratio based on operation of the adjuster dial.

13. The working vehicle according to claim 10, wherein
    the controller device gradually reduces the duty ratio of the control signal when the first hydraulic clutch is switched from being engaged to being disengaged.

14. The working vehicle according to claim 13, comprising a temperature detector device to detect temperature of operation fluid, wherein
    the controller device changes the duty ratio based on the temperature of operation fluid detected by the temperature detector device.

15. The working vehicle according to claim 10, wherein the controller device gradually reduces the duty ratio of the control signal when the second hydraulic clutch is switched from being engaged to being disengaged.

16. The working vehicle according to claim 15, comprising
a temperature detector device to detect temperature of operation fluid, wherein
the controller device changes the duty ratio based on the temperature of operation fluid detected by the temperature detector device.

17. The working vehicle according to claim 10, wherein the controller device gradually reduces the duty ratio of the control signal corresponding to the first hydraulic clutch and gradually increases the duty ratio of the control signal corresponding to the second hydraulic clutch when the first hydraulic clutch is switched to being disengaged and the second hydraulic clutch is switched to being engaged in accordance with the control signal.

18. The working vehicle according to claim 17, comprising
a temperature detector device to detect temperature of operation fluid, wherein
the controller device changes the duty ratio based on the temperature of operation fluid detected by the temperature detector device.

19. The working vehicle according to claim 10, wherein the controller device gradually reduces the duty ratio of the control signal corresponding to the second hydraulic clutch and gradually increases the duty ratio of the control signal corresponding to the first hydraulic clutch when the second hydraulic clutch is switched to being disengaged and the first hydraulic clutch is switched to being engaged in accordance with the control signal.

20. The working vehicle according to claim 19, comprising
a temperature detector device to detect temperature of operation fluid, wherein
the controller device changes the duty ratio based on the temperature of operation fluid detected by the temperature detector device.

* * * * *